United States Patent
Chen et al.

(10) Patent No.: US 11,677,944 B1
(45) Date of Patent: Jun. 13, 2023

(54) VIDEO COMPRESSION METHOD, ELECTRONIC DEVICE, AND COMPUTER PROGRAM PRODUCT

(71) Applicant: Dell Products L.P., Round Rock, TX (US)

(72) Inventors: Tianxiang Chen, Shanghai (CN); Sanping Li, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/677,126

(22) Filed: Feb. 22, 2022

(30) Foreign Application Priority Data

Jan. 21, 2022 (CN) .......................... 202210077331.X

(51) Int. Cl.
  *H04N 19/119* (2014.01)
  *H04N 19/176* (2014.01)
  *H04N 19/136* (2014.01)

(52) U.S. Cl.
  CPC ......... *H04N 19/119* (2014.11); *H04N 19/136* (2014.11); *H04N 19/176* (2014.11)

(58) Field of Classification Search
  CPC ... H04N 19/119; H04N 19/136; H04N 19/176
  See application file for complete search history.

(56) References Cited

U.S. PATENT DOCUMENTS

2009/0161766 A1* 6/2009 Bronstein .............. H04N 19/40
  375/E7.076

OTHER PUBLICATIONS

M. Cavestany et al., "AI Fast-forwards Video for Sport Highlights," https://www.ibm.com/downloads/cas/XKEPLEJD, Apr. 2019, 8 pages.

* cited by examiner

*Primary Examiner* — Nam D Pham
(74) *Attorney, Agent, or Firm* — Ryan, Mason & Lewis, LLP

(57) ABSTRACT

Embodiments of the present disclosure include a video compression method, an electronic device, and a computer program product. In a video compression method provided by embodiments of the present disclosure, a video is segmented into multiple segments based on a first feature of an object extracted from the video, where the object has a first change in each of the multiple segments, and the first feature identifies a start state and an end state of the first change; the multiple segments are grouped based on a similarity of the first change of the object among the multiple segments; and the video is compressed based on the groups of the multiple segments. In this way, for a video with periodically repetitive content, the video is compressed by retaining a part of representative video segments, which can save storage space and network transmission resources and improve computation efficiency, thereby reducing computation cost.

20 Claims, 4 Drawing Sheets

VIDEO COMPRESSION METHOD, ELECTRONIC DEVICE, AND COMPUTER PROGRAM PRODUCT

RELATED APPLICATION(S)

The present application claims priority to Chinese Patent Application No. 202210077331.X, filed Jan. 21, 2022, and entitled "Video Compression Method, Electronic Device, and Computer Program Product," which is incorporated by reference herein in its entirety.

FIELD

Embodiments of the present disclosure relate to the field of signal processing, and more specifically, to a video compression method, an electronic device, and a computer program product.

BACKGROUND

Due to the growing popularity of smart devices and social networks, millions of videos are created and shared every day. The creation of a large number of videos also means that there is a need for massive amounts of storage space. Many videos generally contain a large number of repetitive processes ranging from natural loops to artificial repetitive processes such as traffic patterns, sports, and human behavior.

SUMMARY

In a first aspect of the present disclosure, a video compression method is provided. The method includes segmenting a video into multiple segments based on a first feature of an object extracted from the video, where the object has a first change in each of the multiple segments, and the first feature identifies a start state and an end state of the first change. The method further includes grouping the multiple segments based on a similarity of the first change of the object among the multiple segments. The method further includes compressing the video based on the groups of the multiple segments.

In a second aspect of the present disclosure, an electronic device is provided. The electronic device includes a processor and a memory coupled to the processor, and the memory has instructions stored therein which, when executed by the processor, cause the device to perform actions including segmenting a video into multiple segments based on a first feature of an object extracted from the video, where the object has a first change in each of the multiple segments, and the first feature identifies a start state and an end state of the first change. The actions further include grouping the multiple segments based on a similarity of the first change of the object among the multiple segments. The actions further include compressing the video based on the groups of the multiple segments.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent from description provided herein of example embodiments of the present disclosure, with reference to the accompanying drawings. In the example embodiments of the present disclosure, identical reference numerals generally represent identical parts. In the accompanying drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and then implement the present disclosure, and not to limit the scope of the present disclosure in any way.

The term "include" used herein and variants thereof indicate open-ended inclusion, that is, "including but not limited to." Unless specifically stated, the term "or" indicates "and/or." The term "based on" indicates "at least partially based on." The terms "an example embodiment" and "an embodiment" indicate "at least one example embodiment." The term "another embodiment" indicates "at least one further embodiment." The terms "first," "second," and the like may refer to different or identical objects. Other explicit and implicit definitions may also be included below.

As described above, due to the growing popularity of smart devices and social networks, millions of videos are created and shared every day. The creation of a large number of videos also means that there is a need for massive amounts of storage space. Many videos generally contain a large number of repetitive processes ranging from natural loops to artificial repetitive processes such as traffic patterns, sports, and human behavior. Therefore, a compression technique particularly well-suited for this kind of videos is highly needed so as to save storage space and improve computing efficiency.

Embodiments of the present disclosure provide a video compression solution which only stores and/or transmits key parts in a video and removes repetitive content in the video when storing and/or transmitting the video, thereby implementing highly-efficient compression of videos.

According to embodiments of the present disclosure, a video is segmented into multiple segments based on a feature of an object extracted from the video. The object has a first change in each segment. Then, the multiple segments can be grouped based on a similarity of the first change of the object among the segments. The video is compressed based on the groups. According to embodiments disclosed herein, removing content with high similarity in a video can save storage space and network transmission resources and improve computation efficiency, thereby reducing computation cost.

The basic principles and some example implementations of the present disclosure will be described below with reference to the accompanying drawings. It should be understood that these example embodiments are provided only to enable those skilled in the art to better understand and then implement embodiments of the present disclosure, and are not intended to limit the scope of the present disclosure in any way.

Figure 1:
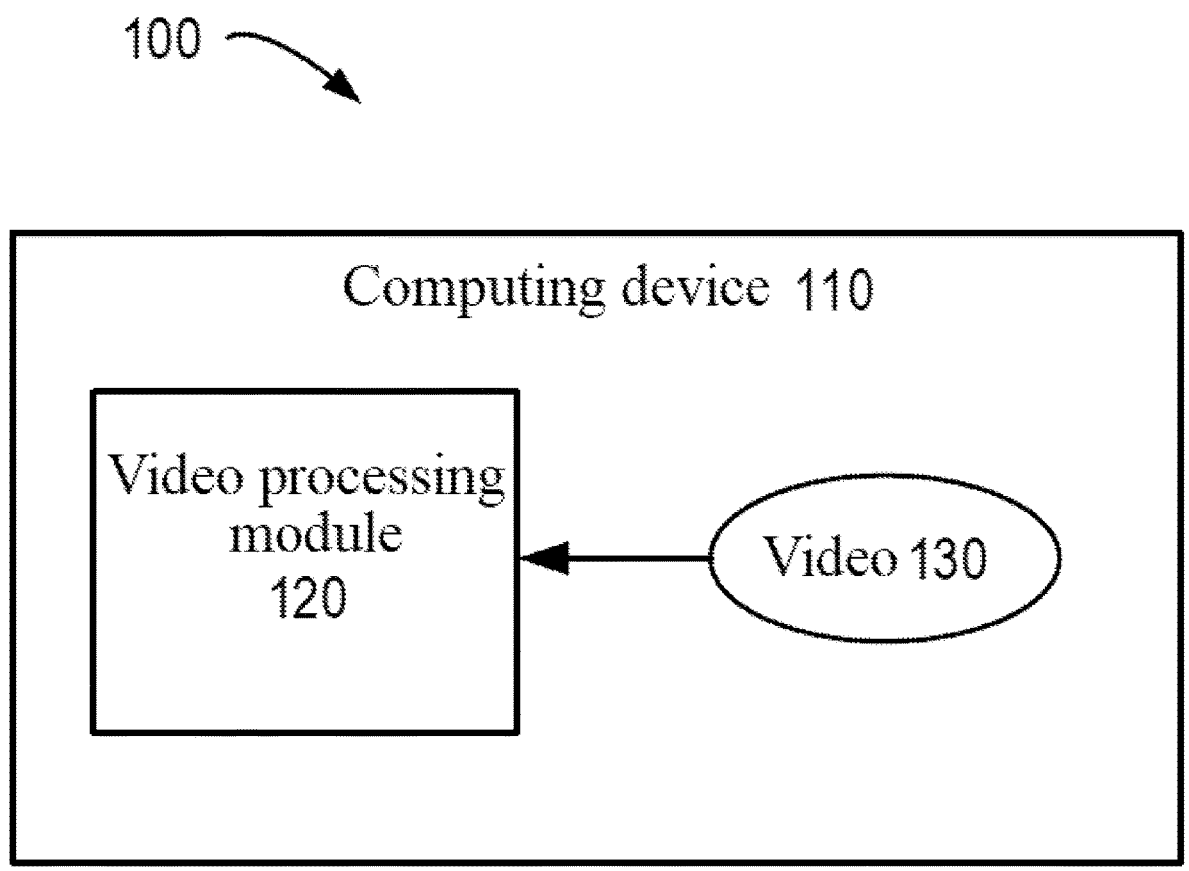
FIG. 1 is a schematic diagram of an example environment in which embodiments of the present disclosure can be implemented.

FIG. 1 is a schematic diagram of an example environment in which embodiments of the present disclosure can be implemented. As shown in FIG. 1, environment 100 may include computing device 110. Computing device 110 may include or may be deployed with video processing module 120. Computing device 110 may generate or obtain video 130 from other devices (not shown in the figure). Video 130 is compressed by video processing module 120, and compressed video 130 is thus obtained. Then, compressed video 130 may be stored by computing device 110 in its storage device, or transmitted by computing device 110 to other devices.

The object included in video 130 may have a first change that is periodically repetitive. For example, in video 130, a person is doing push-ups, and a push-up from start to end can be called a first change. In video 130, it is also possible that only the properties of the object such as color or brightness change periodically, for example, a traffic light changes from red to green and then to red again. A traffic light changing from red to green and then to red can be called a first change.

It should be understood that the content of video 130 is merely exemplary and is not intended to limit the scope of the present disclosure. In an embodiment of the present disclosure, video 130 may be any suitable video having periodically changing content.

Examples of computing device 110 include, but are not limited to, personal computers, smart phones, tablet computers, laptop computers, and desktop computers. The scope of the present disclosure is not limited in this regard.

In addition, it should be understood that the structure and functions of environment 100 are described for illustrative purposes only and do not imply any limitation to the scope of the present disclosure. For example, embodiments of the present disclosure may also be applied to an environment different from environment 100. Although FIG. 1 only shows that the computing device includes video processing module 120, the computing device is not limited to this and may include more processing modules. In addition, although FIG. 1 only shows one video 130, it is not limited to this and may include more videos having repetitive content or other videos.

Figure 2:
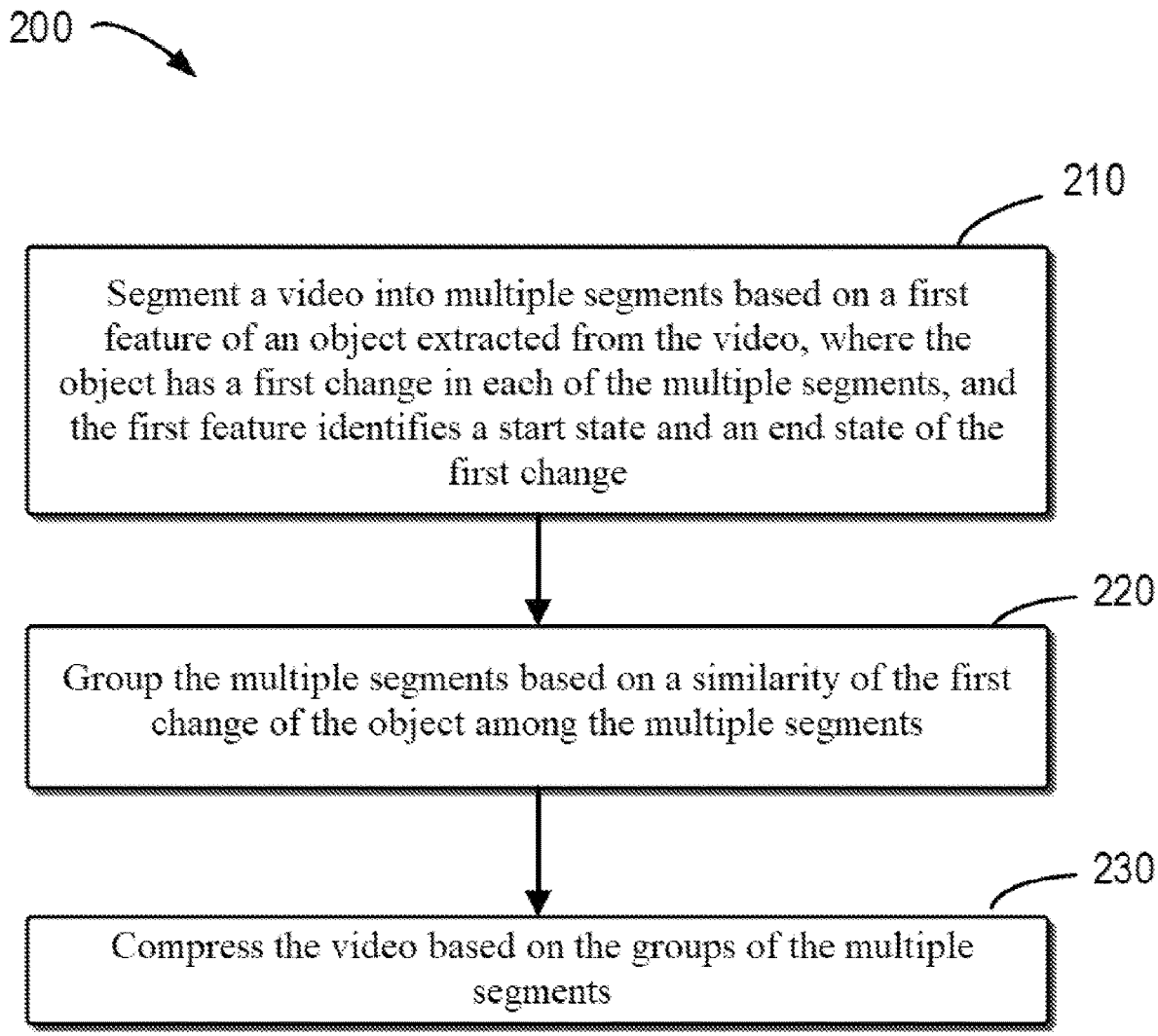
FIG. 2 is a flowchart of an example video compression method according to an embodiment of the present disclosure.

FIG. 2 is a flowchart of example video compression method 200 according to an embodiment of the present disclosure. Method 200, for example, may be executed at video processing module 120 shown in FIG. 1. It should be understood that method 200 may also include additional actions not shown and/or may omit actions shown, and the scope of the present disclosure is not limited in this regard. Method 200 will be described in detail below with reference to FIGS. 1 and 3.

At block 210, video 130 may be segmented into multiple segments based on a first feature of an object extracted from video 130. The object has a first change in each of the multiple segments. The first feature may identify a start state and an end state of the first change.

For example, video 130 is a video that a person is doing push-ups. In video 130, other actions may occur (for example, the curtain is moving in the wind, or other people are moving); however, the person who does push-ups is an object of interest in video 130. The person may be extracted from the video as an object by using known video processing techniques.

The first change may be a complete push-up. Suppose the person does n push-ups in video 130, video 130 may be segmented into n segments, and the person completes one push-up in each of the segments.

The first feature may be that the person's elbow joint has the largest angle (i.e., the elbow joint is straight or nearly straight). When the angle of the elbow joint becomes smaller and smaller from the maximum (i.e., the elbow joint starts bending from a straight or nearly straight state), it indicates that the person is lowering the body to the ground. The first half of the push-up is done when the angle of the elbow joint is the smallest (i.e., the elbow joint is most bent). When the angle of the elbow joint becomes larger from the smallest angle (i.e., straightening from the most bent state of the elbow joint), it indicates that the person is moving the body away from the ground. When the angle of the elbow joint is at its maximum again (i.e., the elbow joint is straightened or nearly straightened again), a complete push-up is done. Therefore, in this embodiment, the maximum angle of the elbow joint may identify a start state and an end state of the push-up.

In some embodiments, the multiple segments are segmented respectively into anterior segments and posterior segments based on a second feature of the object. The object has a preorder change of the first change in each anterior segment of the multiple segments and has a postorder change of the first change in each posterior segment of the multiple segments. The second feature may identify an intermediate state of the first change.

For example, the second feature may be that the angle of the elbow joint is the smallest. The preorder change may be the first half of the push-up, i.e., the body is close to the ground. The postorder change may be the latter half of the push-up, i.e., the body is away from the ground.

In some embodiments, audio information of the video may be used as the first feature and the second feature. Continue the example from the push-up video above, suppose a coach yells "down, up" every time the person does a push-up, when the coach yells "down," the person moves the body close to the ground, and when the coach yells "up," the person moves the body away from the ground. The first feature may be audio information corresponding to "down," and the second feature may be audio information corresponding to "up."

In some other embodiments, a first feature may be a combination of multiple features. For example, the elbow joint having the largest angle and the audio information corresponding to "down" may be combined as the first feature, and the elbow joint having the smallest angle and the audio information corresponding to "up" may be combined as the second feature.

It should be understood that the first feature and the second feature stated above are merely exemplary, and are not intended to limit the scope of the present disclosure. In embodiments of the present disclosure, the first feature may be any suitable feature as long as it can identify the start state and the end state of the first change. The first feature includes, but is not limited to: coordinate points of body joints, human expressions, colors of signal lights, actions of athletes, commentary of commentators, background sounds, real-time values of sensors, and the like.

Figure 3:
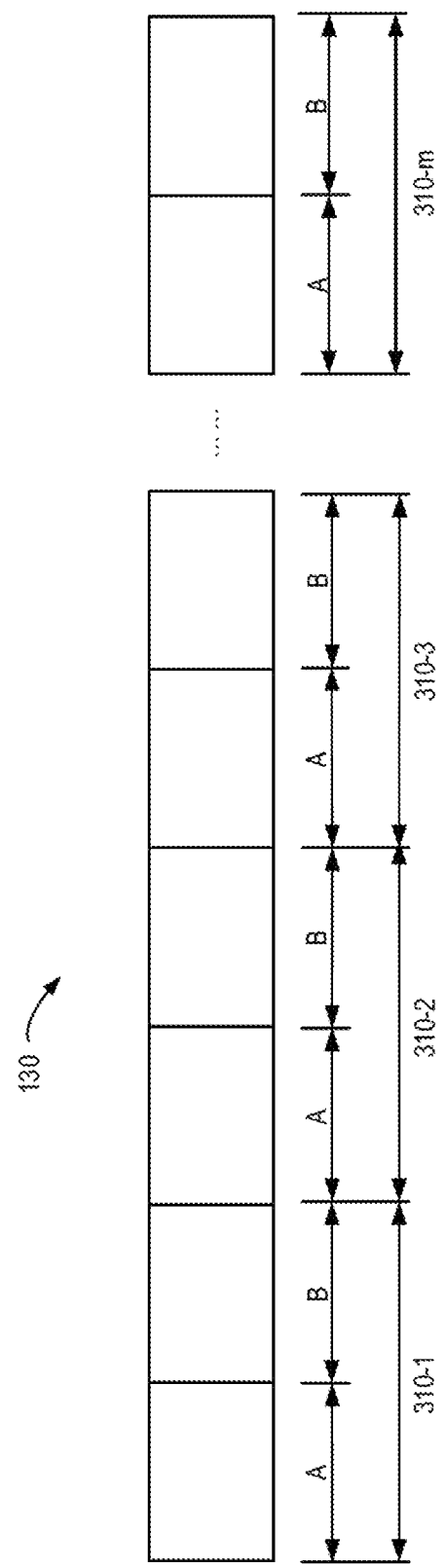
FIG. 3 is a schematic diagram that illustrates segmenting of a video according to some embodiments of the present disclosure.

FIG. 3 is a schematic diagram of segmenting video 130 according to some embodiments of the present disclosure. As shown in FIG. 3, video 130 is segmented into segment 310-1, segment 310-2, segment 310-3, . . . , segment 310-*m* (also collectively or individually referred to as "segments 310") based on a first feature (for example, the largest angle of an elbow joint) of an object extracted from video 130, where m is a natural number.

Segment 310 is segmented into anterior segments A and posterior segments B based on a second feature (for example, the smallest angle of the elbow joint) of the object. The object has a preorder change (such as a first half of a push-up) of a first change in each anterior segment A, and the object has a postorder change (such as a latter half of the push-up) of the first change in each posterior segment B.

Referring back to FIG. 2, at block 220, multiple segments 310 are grouped based on a similarity of the first change of the object among multiple segments 310.

In some embodiments, when determining whether to classify a first segment (such as 310-1) and a second segment (such as 310-2) in multiple segments 310 into the same group, a similarity of the first change of the object between first segment 310-1 and second segment 310-2 may be determined. In response to the similarity exceeding a threshold, segment 310-1 and segment 310-2 are classified into the same group. Similarly, all the segments are compared so as to complete grouping of all the segments.

In this way, since no other information than the object is needed for comparison, computation cost may be saved, and efficiency for processing videos is improved.

In some embodiments, to determine the similarity between the first segment (such as 310-1) and the second segment (such as 310-2) in multiple segments 310, the first segment and the second segment can be converted into two groups of frames with the same quantity of frames. Then, similarities between corresponding frames of the two groups of frames for a macroblock representing the object are summed as the similarity between the first segment and the second segment.

For example, when determining the similarity between segment 310-1 and segment 310-2, segment 310-1 and segment 310-2 are converted into multiple frames respectively. Then, the same quantity of frames is chosen from corresponding multiple frames to compose a first group of frames corresponding to segment 310-1 and a second group of frames corresponding to segment 310-2 to compare the similarity of the object between segment 310-1 and segment 310-2.

In some embodiments, converting the first segment and the second segment into two groups of frames with the same quantity of frames may include: combining a part of frames of the first segment and/or combining a part of frames of the second segment to make the quantity of frames of the first segment the same as that of the second segment. Then, all the frames of the first segment are used as the first group of frames, and all the frames of the second segment are used as the second group of frames. For example, one or more new frames may be generated by averaging two or more frames. However, this is merely for illustrative purposes, and the scope of the present disclosure is not limited in this regard. Any suitable method may be used for combining frames.

In this way, detailed information in the segments may be better retained so as to better determine a similarity between segments.

In some embodiments, determining the similarity among multiple segments 310 may include: determining a first similarity of the preorder change of the first change between anterior segment A of the first segment (such as 310-1) and anterior segment A of the second segment (such as 310-2) in multiple segments 310; determining a second similarity of the postorder change of the first change between posterior segment B of first segment 310-1 and posterior segment B of second segment 310-2; and summing the first similarity and the second similarity as the similarity between first segment 310-1 and the second segment 310-2.

In some embodiments, determining the first similarity may include: converting anterior segment A of the first segment (such as 310-1) and anterior segment A of the second segment (such as 310-2) into two groups of frames with the same quantity of frames; and summing similarities between corresponding frames of the two groups of frames for a macroblock representing the object as the first similarity. Determining the second similarity may include: converting posterior segment B of the first segment (such as 310-1) and posterior segment B of the second segment (such as 310-2) into two groups of frames with the same quantity of frames; and summing similarities between corresponding frames of the two groups of frames for a macroblock representing the object as the second similarity. The method of converting anterior segment A and posterior segment B into two groups of frames is similar to that of converting the first segment and the second segment into two groups of frames, which is not repeated herein.

In some other embodiments, converting the first segment and the second segment into two groups of frames with the same quantity of frames may include: combining a group of converted frames of anterior segment A of the first segment (such as 310-1) and a group of converted frames of posterior segment B of the first segment as a first group of converted frames of the first segment; and combining a group of converted frames of anterior segment A of the second segment (such as 310-2) and a group of converted frames of posterior segment B of the second segment as a second group of converted frames of the second segment.

In this way, when determining the similarity of the first change of the object between segments, it can be ensured that the preorder change of the object will not be compared with the postorder change of the object so as to improve the matching rate.

Subsequently, similarity S between corresponding frames of the first group of frames and the second group of frames on the object is determined, and similarities S among all the corresponding frames are summed as the similarity between segment 310-1 and segment 310-2 on the object. Specifically, instead of comparing corresponding pixels of the object, macroblocks representing the object between corresponding frames are compared. How to determine similarity S between two corresponding frames will be described in detail below.

For example, two corresponding frames p and q of the first group of frames and the second group of frames are used as an example. There are t macroblocks representing an object in p and q. Symbol $R_i$ represents the ith macroblock in p and q, and $i \in [1, t]$. The macroblocks in the t macroblocks may be different in size, but two corresponding macroblocks $R_i$ in the corresponding frames p and q are the same in size.

Similarity $S_i$ between p and q for ith macroblock $R_i$ may be determined by comparing RGB values of corresponding pixels. If a difference between the RGB values of two corresponding pixels is less than a threshold, it is considered that the two pixels are similar and a similarity between the two pixels is scored as 1. Otherwise, it is considered that the two pixels are not similar and a similarity between the two pixels is scored as 0. Then, scores of similarities of all the corresponding pixels are summed as similarity $S_i$ between corresponding frames p and q for ith macroblock $R_i$.

It should be understood that determining a similarity score of a pixel based on a threshold described above is merely exemplary, and is not intended to limit the scope of the present disclosure. In embodiments of the present disclosure, the similarity score of the pixel may be determined based on more thresholds. Similarly, a value of the similarity score of the pixel is merely exemplary, and is not intended to limit the scope of the present disclosure. In embodiments of the present disclosure, the similarity score of the pixel may be any suitable value. For example, when determining the similarity score of the pixel based on two thresholds, values of the score may be three values such as 0, 0.5, and 1.

After similarity $S_i$ of each macroblock is determined, similarity S of the object between corresponding frames p and q may be represented by the following formula (1):

$$S = \sum_{i=1}^{t} S_i \quad (1)$$

The first similarity and the second similarity may be determined similarly as stated above, which is not repeated herein.

Then at block 230, video 130 is compressed based on the groups of multiple segments 310. For segments in each group, only one segment may be retained as a part of the compressed video. For example, segment 310-1, segment 310-2, and segment 310-m shown in FIG. 3 are classified into the same group, segment 310-3 is classified into a different group, and no other segments are classified into the same group with segment 310-3. Segment 310-1 (or 310-2 or 310-m) and segment 310-3 may be retained as a part of compressed video 130. Suppose m segments shown in FIG. 3 are divided into w groups based on similarities among the segments (w is a natural number), the quantity of finally retained segments is w.

When restoring video 130 compressed in such way, the retained segments may be duplicated in place of discarded segments. For example, when video 130 is compressed, suppose segment 310-1 is retained and segment 310-2 and segment 310-m are discarded, when restoring the group in which segment 310-1 is located, segment 310-1 may be duplicated in place of segment 310-2 and segment 310-m. For the group in which segment 310-3 is located, since no segments are discarded, there is no need to duplicate segment 310-3.

Although videos compressed and decompressed in this way will lose some information (for example, background information, the curtain is moving in the wind, other people are moving, and the like), the lost information is not key information or information that is of interest to the user. In this way, for a video with periodically repetitive content, the video is compressed by retaining a part of representative video segments, which can save storage space and network transmission resources, and improve computation efficiency so as to reduce computation cost.

Figure 4:
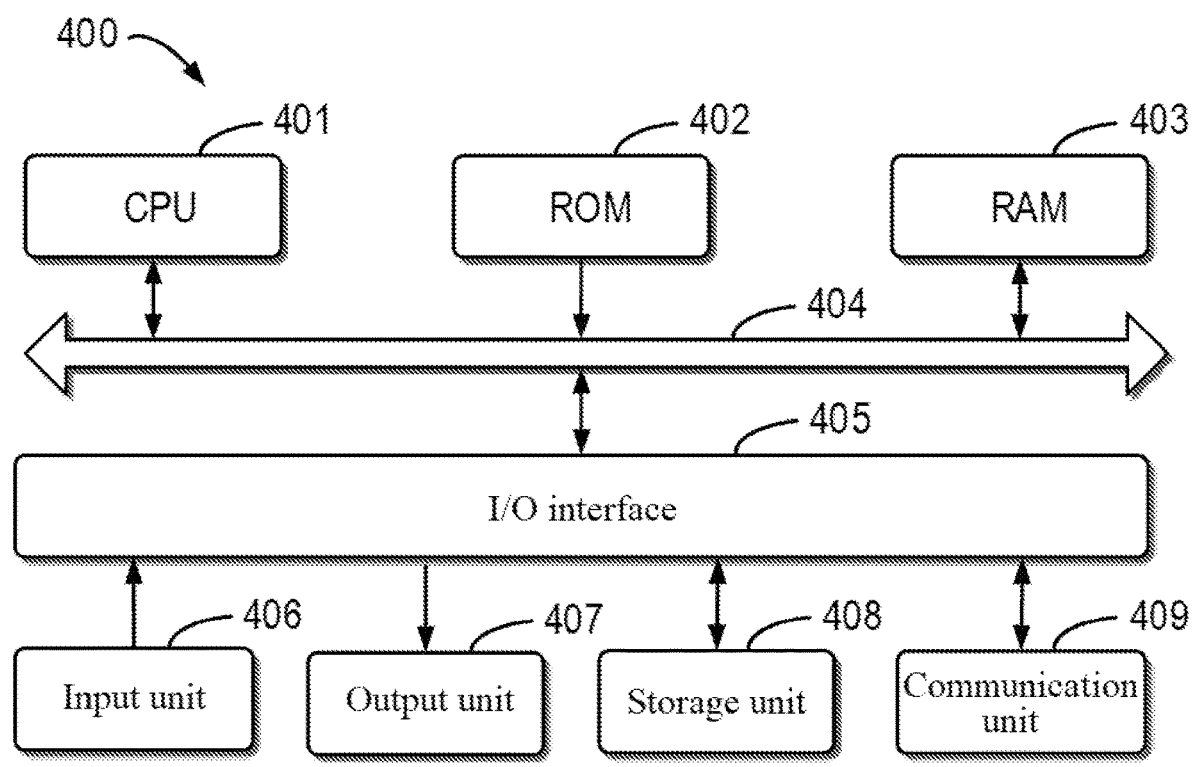
FIG. 4 is a block diagram of an example device that can be used to implement embodiments of the present disclosure.

FIG. 4 is a schematic block diagram of example device 400 that can be used to implement embodiments of the present disclosure. For example, computing device 110 shown in FIG. 1 may be implemented by device 400. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200, may be executed by CPU 401. For example, in some embodiments, method 200 may be implemented as a computer software program that is tangibly included in a machine-readable medium such as storage unit 408. In some embodiments, part of or all the computer programs may be loaded and/or installed onto device 400 via ROM 402 and/or communication unit 409. When the computer program is loaded into RAM 403 and executed by CPU 401, one or more actions of method 200 described above may be implemented.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or the block diagrams and combinations of blocks in the flowcharts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flowcharts as well as a combination of blocks in the block diagrams and/or flowcharts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A video compression method, comprising:
   segmenting a video into multiple segments based on a first feature of an object extracted from the video, wherein the object has a first change in each of the multiple segments, and the first feature identifies a start state and an end state of the first change;
   grouping the multiple segments based on a similarity of the first change of the object among two or more of the multiple segments exceeding a threshold; and
   compressing the video based on the groups of the multiple segments.

2. The method according to claim 1, wherein grouping the multiple segments comprises:
   determining a similarity of the first change of the object between a first segment and a second segment in the multiple segments; and
   dividing the first segment and the second segment into the same group in response to the similarity exceeding the threshold.

3. The method according to claim 1, wherein determining the similarity comprises:
   converting a first segment and a second segment in the multiple segments into two groups of frames with the same quantity of frames; and
   summing similarities between corresponding frames of the two groups of frames for a macroblock representing the object, as the similarity between the first segment and the second segment.

4. The method according to claim 1, wherein the method further comprises:
   segmenting the multiple segments respectively into anterior segments and posterior segments based on a second feature of the object, wherein the object has a preorder change of the first change in each anterior segment of the multiple segments, the object has a postorder change of the first change in each posterior segment of the multiple segments, and the second feature identifies an intermediate state of the first change.

5. The method according to claim 4, wherein determining the similarity comprises:
   determining a first similarity of the preorder change between the anterior segments of a first segment and the anterior segments of a second segment in the multiple segments;
   determining a second similarity of the postorder change between the posterior segments of the first segment and the posterior segments of the second segment; and
   summing the first similarity and the second similarity as the similarity between the first segment and the second segment.

6. The method according to claim 5, wherein determining the first similarity comprises:
   converting the anterior segment of the first segment and the anterior segment of the second segment into two groups of frames with the same quantity of frames; and
   summing similarities between corresponding frames of the two groups of frames for a macroblock representing the object, as the first similarity.

7. The method according to claim 5, wherein determining the second similarity comprises:
   converting the posterior segment of the first segment and the posterior segment of the second segment into two groups of frames with the same quantity of frames; and
   summing similarities between corresponding frames of the two groups of frames for a macroblock representing the object, as the second similarity.

8. An electronic device, comprising:
   a processor; and
   a memory coupled to the processor, the memory having instructions stored therein, wherein the instructions, when executed by the processor, cause the electronic device to perform actions comprising:
   segmenting a video into multiple segments based on a first feature of an object extracted from the video, wherein the object has a first change in each of the multiple segments, and the first feature identifies a start state and an end state of the first change;
   grouping the multiple segments based on a similarity of the first change of the object among two or more of the multiple segments exceeding a threshold; and
   compressing the video based on the groups of the multiple segments.

9. The electronic device according to claim 8, wherein grouping the multiple segments comprises:
   determining a similarity of the first change of the object between a first segment and a second segment in the multiple segments; and
   dividing the first segment and the second segment into the same group in response to the similarity exceeding the threshold.

10. The electronic device according to claim 8, wherein determining the similarity comprises:
   converting a first segment and a second segment in the multiple segments into two groups of frames with the same quantity of frames; and
   summing similarities between corresponding frames of the two groups of frames for a macroblock representing the object, as the similarity between the first segment and the second segment.

11. The electronic device according to claim 8, wherein the actions further comprise:
   segmenting the multiple segments respectively into anterior segments and posterior segments based on a second feature of the object, wherein the object has a preorder change of the first change in each anterior segment of the multiple segments, the object has a postorder change of the first change in each posterior segment of the multiple segments, and the second feature identifies an intermediate state of the first change.

12. The electronic device according to claim 11, wherein determining the similarity comprises:
   determining a first similarity of the preorder change between the anterior segments of a first segment and the anterior segments of a second segment in the multiple segments;
   determining a second similarity of the postorder change between the posterior segments of the first segment and the posterior segments of the second segment; and
   summing the first similarity and the second similarity as the similarity between the first segment and the second segment.

13. The electronic device according to claim 12, wherein determining the first similarity comprises:
   converting the anterior segment of the first segment and the anterior segment of the second segment into two groups of frames with the same quantity of frames; and
   summing similarities between corresponding frames of the two groups of frames for a macroblock representing the object, as the first similarity.

14. The electronic device according to claim 12, wherein determining the second similarity comprises:
   converting the posterior segment of the first segment and the posterior segment of the second segment into two groups of frames with the same quantity of frames; and
   summing similarities between corresponding frames of the two groups of frames for a macroblock representing the object, as the second similarity.

15. A computer program product tangibly stored on a non-transitory computer-readable medium and comprising machine-executable instructions, wherein the machine-executable instructions, when executed by a machine, cause the machine to perform a video compression method, the method comprising:
   segmenting a video into multiple segments based on a first feature of an object extracted from the video, wherein the object has a first change in each of the multiple segments, and the first feature identifies a start state and an end state of the first change;
   grouping the multiple segments based on a similarity of the first change of the object among two or more of the multiple segments exceeding a threshold; and compressing the video based on the groups of the multiple segments.

16. The computer program product according to claim 15, wherein grouping the multiple segments comprises:
   determining a similarity of the first change of the object between a first segment and a second segment in the multiple segments; and
   dividing the first segment and the second segment into the same group in response to the similarity exceeding the threshold.

17. The computer program product according to claim 15, wherein determining the similarity comprises:
   converting a first segment and a second segment in the multiple segments into two groups of frames with the same quantity of frames; and
   summing similarities between corresponding frames of the two groups of frames for a macroblock representing the object, as the similarity between the first segment and the second segment.

18. The computer program product according to claim 15, wherein the method further comprises:
   segmenting the multiple segments respectively into anterior segments and posterior segments based on a second feature of the object, wherein the object has a preorder change of the first change in each anterior segment of the multiple segments, the object has a postorder change of the first change in each posterior segment of the multiple segments, and the second feature identifies an intermediate state of the first change.

19. The computer program product according to claim 18, wherein determining the similarity comprises:
   determining a first similarity of the preorder change between the anterior segments of a first segment and the anterior segments of a second segment in the multiple segments;
   determining a second similarity of the postorder change between the posterior segments of the first segment and the posterior segments of the second segment; and
   summing the first similarity and the second similarity as the similarity between the first segment and the second segment.

20. The computer program product according to claim 19, wherein determining the first similarity comprises:
   converting the anterior segment of the first segment and the anterior segment of the second segment into two groups of frames with the same quantity of frames; and
   summing similarities between corresponding frames of the two groups of frames for a macroblock representing the object, as the first similarity.

* * * * *